(12) United States Patent  (10) Patent No.: US 7,729,522 B2
Nordin  (45) Date of Patent: Jun. 1, 2010

(54) METHODS, COMPUTER PROGRAM PRODUCTS AND DEVICES FOR CHECK OF IDENTITY

(75) Inventor: Bjorn Nordin, Lund (SE)

(73) Assignee: Precise Biometrics AB, Lund (SE)

( * ) Notice: Subject to any disclaimer, the term of this patent is extended or adjusted under 35 U.S.C. 154(b) by 580 days.

(21) Appl. No.: 10/546,480

(22) PCT Filed: Feb. 12, 2004

(86) PCT No.: PCT/SE2004/000182

§ 371 (c)(1),
(2), (4) Date: May 30, 2006

(87) PCT Pub. No.: WO2004/074978

PCT Pub. Date: Sep. 2, 2004

(65) Prior Publication Data

US 2007/0014444 A1  Jan. 18, 2007

Related U.S. Application Data

(60) Provisional application No. 60/448,891, filed on Feb. 24, 2003.

(30) Foreign Application Priority Data

Feb. 24, 2003  (SE) .................................. 0300478

(51) Int. Cl.
H06K 9/00  (2006.01)
(52) U.S. Cl. ....................................... 382/125; 382/124
(58) Field of Classification Search .................. 382/125, 382/124
See application file for complete search history.

(56) References Cited

U.S. PATENT DOCUMENTS

| 4,135,147 A | * | 1/1979 | Riganati et al. ............. 382/125 |
| 4,646,352 A |   | 2/1987 | Asai et al. |
| 4,896,363 A | * | 1/1990 | Taylor et al. ................ 382/125 |

(Continued)

FOREIGN PATENT DOCUMENTS

EP  0300167 A2  1/1989

(Continued)

OTHER PUBLICATIONS

Jiang et al., Centre for Signal Processing, Nanyang Technolotgtical University, "Fingerprint Minutiae Matching Based on the Local And Global Structures", pp. 1038-1041, (2000).

(Continued)

*Primary Examiner*—Bhavesh M Mehta
*Assistant Examiner*—Michael Vanchy, Jr.
(74) *Attorney, Agent, or Firm*—Birch, Stewart, Kolasch & Birch, LLP (57) ABSTRACT

A method for creating a representation of a fingerprint is disclosed. The method comprises creating unique pairs of minutiae points identified in the fingerprint, each pair of minutiae points being represented by a distance between the minutiae points and by angles associated with the respective minutiae points included in the pair. Moreover, methods are disclosed for use in checking a person's identity and in creating reference data for checking a person's identify. Moreover, computer program products and devices for carrying out the methods are disclosed.

22 Claims, 5 Drawing Sheets

U.S. PATENT DOCUMENTS

| | | | | |
|---|---|---|---|---|
| 5,631,972 A | * | 5/1997 | Ferris et al. | 382/125 |
| 5,901,239 A | * | 5/1999 | Kamei | 382/125 |
| 6,049,621 A | * | 4/2000 | Jain et al. | 382/125 |
| 6,072,895 A | * | 6/2000 | Bolle et al. | 382/125 |
| 6,185,318 B1 | * | 2/2001 | Jain et al. | 382/125 |
| 6,314,197 B1 | * | 11/2001 | Jain et al. | 382/125 |
| 6,330,347 B1 | * | 12/2001 | Vajna | 382/125 |
| 6,487,306 B1 | * | 11/2002 | Jain et al. | 382/125 |
| 6,941,003 B2 | * | 9/2005 | Ziesig | 382/124 |
| 2003/0039382 A1 | * | 2/2003 | Yau et al. | 382/125 |
| 2003/0044052 A1 | * | 3/2003 | Martin | 382/125 |
| 2004/0243356 A1 | * | 12/2004 | Duffy et al. | 702/189 |
| 2005/0058325 A1 | * | 3/2005 | Udupa et al. | 382/125 |

FOREIGN PATENT DOCUMENTS

| | | |
|---|---|---|
| EP | 0862131 A2 | 9/1998 |
| WO | WO 01/84494 A1 | 11/2001 |
| WO | WO-01/84494 A1 | 11/2001 |

OTHER PUBLICATIONS

Germain et al., IEEE Computational Science & Engineering, "Fingerprint Matching Using Transformation Parameter Clustering", pp. 42-49, (1997). XP002361694.

* cited by examiner

METHODS, COMPUTER PROGRAM PRODUCTS AND DEVICES FOR CHECK OF IDENTITY

FIELD OF THE INVENTION

The present invention relates to methods, computer program products and devices for creating a representation of a fingerprint, for use in checking a person's identity and for creating reference data for checking a person's identity.

BACKGROUND ART

It is known to identify in a fingerprint what is referred to as minutiae points, and identify or verify a person's identity using a plurality of such minutiae points' location, type and orientation in the fingerprint. In a first recording of a person's fingerprint a template is created, which constitutes reference data that is associated with the person's identity. This process is usually referred to as enrolment. The template can be stored electronically, either in a database of a plurality of people's identity, or on a data carrier, such as a smart card, carried by the person. A recorded fingerprint is frequently stored and processed as an image file, which is usually preprocessed, for example, by binarisation before it can be used. When a person's identity is to be verified or determined, an image of the person's fingerprint is recorded in a prior-art manner, usually by means of a silicon sensor. The image recorded is here referred to as "current fingerprint".

In a "verification" of the person's identity, a current fingerprint is compared with a template, for the purpose of deciding whether the person having the current fingerprint is the person she pretends to be, i.e. the person with whom the smart card is associated.

In an "identification" of a person's identity, a current fingerprint is compared with a plurality of templates which are usually stored in a database.

In the following the expression "checking a person's identity" will be used to comprise both identification and verification.

Several techniques of representing fingerprints electronically are known. The above-described image file can be processed for identification of minutiae points. It is known to use minutiae points, the location and orientation of which in a person's fingerprint constitute unique features of the person. It is also known to identify minutiae points and to determine their type, location and orientation in a coordinate system. In a verification or identification, the minutiae points of a current fingerprint can be compared with minutiae points from one or more templates.

A variant of this method comprises selecting a reference minutiae point and representing the remaining minutiae points in relation to this reference point. This can make it easier to handle a situation where the orientation of the current fingerprint differs from the orientation of the template.

U.S. Pat. No. 4,135,147 discloses a method where a minutiae point is described in relation to minutiae neighbourhoods. In the method according to U.S. Pat. No. 4,135,147 a vector is created, which describes each minutiae point in terms of distance and angles in relation to the minutiae neighbourhoods. A template consisting of a plurality of such vectors can, in an identity check, be compared with a plurality of vectors which represent an unknown fingerprint. Since each minutiae point is described in relation to minutiae neighbourhoods, each such vector will contain a relative large amount of information which need be compared when checking a person's identity.

In a fingerprint 25-30 minutiae points are often found, sometimes up to 200. In the cases where a reference minutiae point is used, this is in most cases arbitrarily selected in the template. This may imply that all points in a current fingerprint must be tested as reference minutiae point, pairs of minutiae points being formed with each of all the other points, for the purpose of finding a match.

This method of representing fingerprints, however, requires a relatively large storage space, which is disadvantageous if it is desirable to store the fingerprint on a carrier with a limited storage space, such as a smart card.

Besides, the comparisons that must be made between a current fingerprint and a template are fairly complicated and take a long time. Thus, they are also less suitable for use in methods for checking a person's identity, in which a current fingerprint is to be compared with a large number of alternative previously recorded fingerprints.

SUMMARY OF THE INVENTION

An object of the present invention is to wholly or partly eliminate problems associated with prior art. Other objects will be evident from the following description.

The object is wholly or partly achieved by a method, a device and a computer program product according to the independent claims. Embodiments of the invention are defined by the dependent claims and by the following description.

According to a first aspect, a method is provided for creating a representation of a fingerprint. The method comprises creating unique pairs of minutiae points identified in the fingerprint, each unique pair of minutiae points being represented by a distance between said minutiae points and by angles associated with the respective minutiae points included in the pair.

By "unique pair" is meant that two minutiae points included in the pair appears as a pair only once.

The method makes it possible to provide a compact storage format for biometric data. This storage space allows a quick comparison between reference data and corresponding data from a current fingerprint.

The angles can represent the orientation of the respective minutiae points, and an embodiment of the invention is characterised in that the unique pairs of minutiae points are only represented by a distance and two angles.

According to another embodiment of the invention, the pair can also be represented by data indicating the type of the respective minutiae points. Examples of types are ridge endings or ridge bifurcations. Also other types are conceivable.

According to one embodiment, the angles are represented relative to a straight line extending through both minutiae points included in the pair. This adds to making the representation independent of the orientation of the fingerprint since each pair of minutiae points are related to each other and do not have to be adjusted according to a predetermined coordinate system.

According to an alternative embodiment, the angles can, however, be represented relative to a predetermined coordinate system.

According to one embodiment, the fingerprint is represented by a set of unique pairs of minutiae points. A set of unique pairs relates to a data structure, i.e. a vector or matrix, which represents all unique pairs of minutiae points associated with a fingerprint.

According to one embodiment, such a set can be represented as a data structure, which is indexed based on the angles associated with the respective minutiae points included in the pair. For instance, the distance between the minutiae points included in a pair can be arranged in the data structure, indexed based on the angles. Thus a two-dimensional matrix structure, or the like, can be obtained, which in each cell contains a distance value. Each cell can be uniquely pointed out by letting the angles associated with the minutiae points constitute the index.

This results in a data structure which is two-dimensionally indexed, a first dimension being indexed based on a first angle, which is associated with a first minutiae point included in said pair of minutiae points, and a second dimension being indexed based on a second angle, which is associated with a second minutiae point included in said pair of minutiae points.

According to a second aspect of the invention, a method is provided for use in checking a person's identity. The method comprises identifying in an electronic representation of a fingerprint first and second minutiae points, determining said distance between said first and second minutiae points, and determining first and second angles associated with said first and second minutiae points. The method further comprises one of the steps described above.

According to a third aspect, a device is provided for use in checking a person's identity, comprising a data processing unit. The device is characterised in that said data processing unit is arranged to create unique pairs of minutiae points identified in the fingerprint, each unique pair of minutiae points being represented by a distance between said minutiae points and by angles associated with the respective minutiae points included in the pair. Such a device can be a fingerprint reader, in which a fingerprint is processed according to the method.

According to a fourth aspect, a device is provided for use in checking a person's identity, comprising a data processing unit. The device is characterised in that said data processing unit is arranged to compare a representation of a current fingerprint with reference fingerprint data, said representation of a current fingerprint comprising unique pairs of minutiae points identified in the current fingerprint, and said reference fingerprint data comprising unique pairs of minutiae points identified in a reference fingerprint, each unique pair of minutiae points being represented by a distance between said minutiae points and by angles associated with the respective minutiae points included in the pair. Such a device can be a smart card, on which a comparison is made between a current fingerprint and reference fingerprint data.

According to a fifth aspect, a method is provided for creating reference data for checking a person's identity. The method comprises identifying in an electronic representation of a fingerprint first and second minutiae points, determining a distance between said first and second minutiae points, and determining first and second angles associated with said first and second minutiae points. The method further comprises steps according to the method described above.

According to additional aspects of the invention, the methods can be implemented in the form of computer program products or in the form of application specific integrated circuits (ASIC), which have been adapted to perform the method.

BRIEF DESCRIPTION OF THE DRAWINGS

The invention will now be described with reference to the accompanying schematic drawings, which illustrate non-limiting examples of embodiments of the invention.

DESCRIPTION OF EMBODIMENTS

Figure 1:
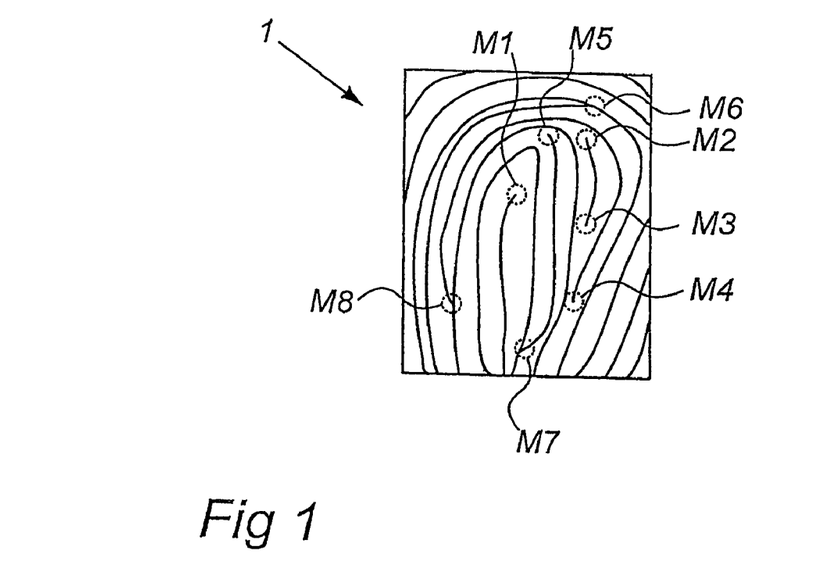
FIG. 1 is a schematic image of part of a fingerprint, in which a plurality of minutiae points have been identified.

With reference to FIG. 1, a schematic image of part of a fingerprint 1 is shown, in which a plurality of minutiae points M1-M8 have been identified in a prior-art manner, for the purpose of illustration marked with dotted rings. The marked minutiae points M1-M8 are of the type endings M1-M5 and bifurcations M6-M8. Also other types of minutiae points may occur and are processed analogously.

Figure 2:
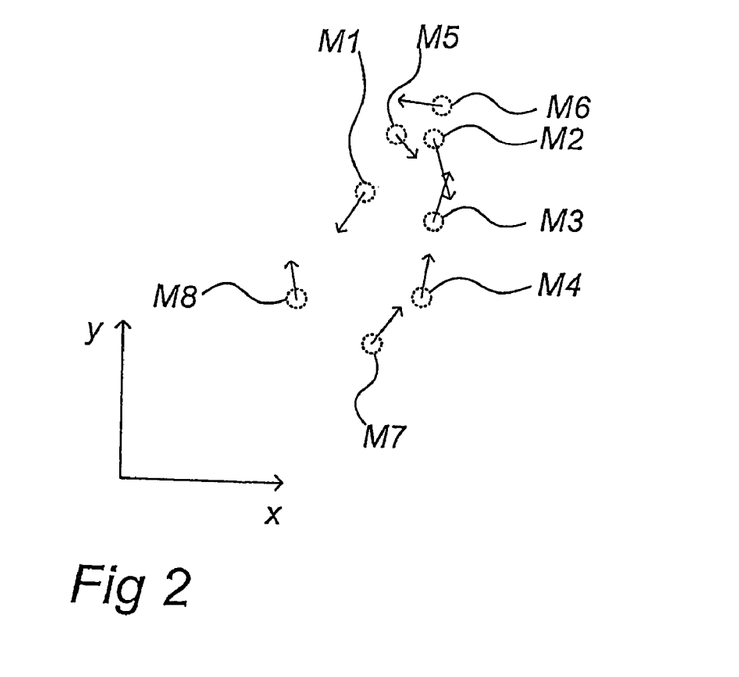
FIG. 2 illustrates schematically the minutiae points in FIG. 1, when extracted from the image.

FIG. 2 illustrates schematically how the minutiae points identified in FIG. 1 have been extracted in a prior-art manner from the image and arranged according to a coordinate system. For each minutiae point, a directional vector has been identified in a prior-art manner. Table 1 shows a non-limiting example of how the eight points can be represented and stored by indicating for each point a directional vector, an x coordinate, a y coordinate and a type, i.e. ending ("E") or bifurcation ("B").

TABLE 1

Data for minutiae points from FIG. 1

| Point | Direction | x coord | y coord | Type |
|-------|-----------|---------|---------|------|
| M1    | θ1        | X1      | Y1      | E    |
| M2    | θ2        | X2      | Y2      | E    |
| M3    | θ3        | X3      | Y3      | E    |
| M4    | θ4        | X4      | Y4      | E    |
| M5    | θ5        | X5      | Y5      | E    |
| M6    | θ6        | X6      | Y6      | B    |
| M7    | θ7        | X7      | Y7      | B    |
| M8    | θ8        | X8      | Y8      | B    |

It will be appreciated that from these n minutiae points, $$\sum_{i=1}^{n-1} i$$

different pairs of minutiae points can be created. Thus, 28 different pairs of minutiae points can be created from 8 points.

Figure 3A:
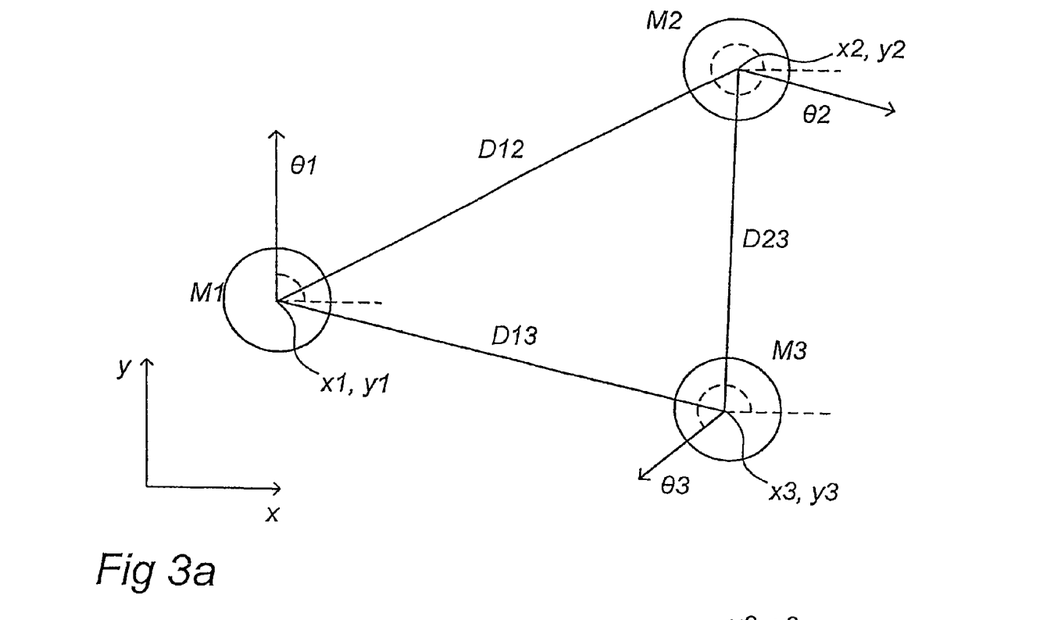
FIG. 3*a* is a schematic image of three minutiae points.

The direction will now, with reference to FIG. 3*a*, be directed to pairwise processing of minutiae points M1, M2, M3, which are assumed to be identified in an image of a fingerprint. The described method can be applied in enrolment, identification and verification. The described method uses only the location and orientation of the minutiae points relative to each other, but it will be appreciated that also other features, such as type, absolute location etc, can be used to supplement the described method.

FIG. 3*a* shows three minutiae points M1, M2, M3 which have been identified, for instance, in the image in FIG. 1. Each of the minutiae points is represented by a pair of coordinates x1, y1; x2, y2; x3, y3 and an angle θ1, θ2 and θ3, respectively. The angles θ1, θ2, θ3 are here calculated in relation to the x axis in the coordinate system of the image, as is indicated in FIG. 3a by means of dashed lines. Furthermore, FIG. 3a shows distance lines D12, D13 and D23 between the respective pairs of minutiae points.

Figure 3B:
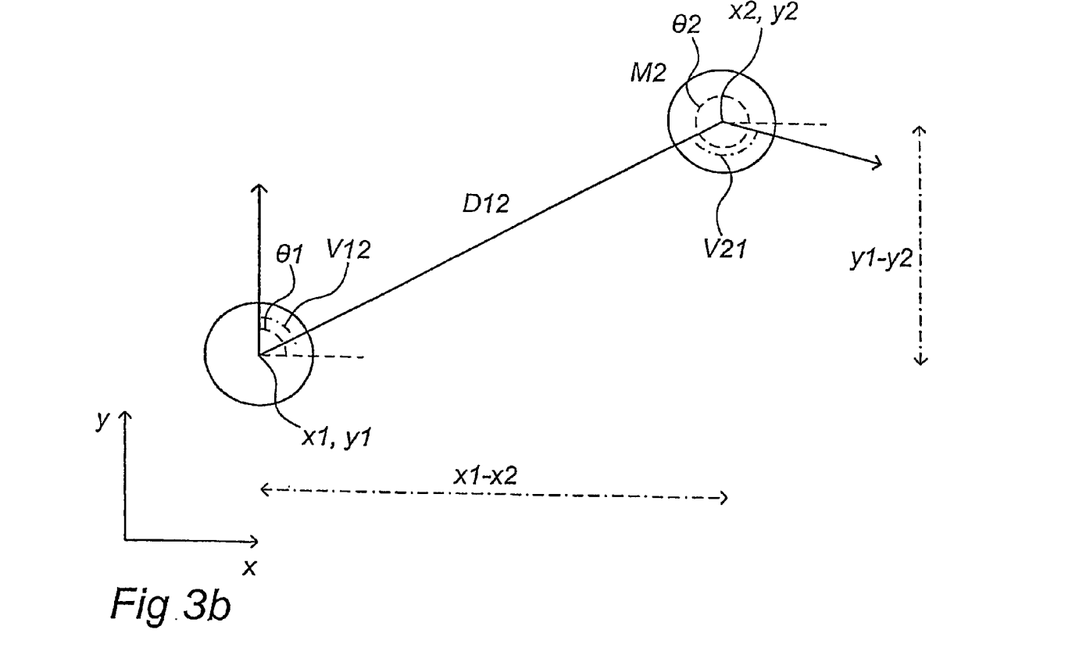
FIG. 3*b* is a schematic image of a pair of minutiae points.

FIG. 3b shows a pair of two minutiae points M1, M2 from FIG. 3a. In addition to pairs of coordinates x1, x2; y1, y2 and angles θ1, θ2, there are also indicated by a dash-dotted line angles V12 and V21, respectively, between the directional vectors of the minutiae points and a distance line D12 between the minutiae points M1, M2. It is further indicated by a dash-dotted line how the distance between the minutiae points in x direction and y direction, respectively, is calculated.

Figure 4:
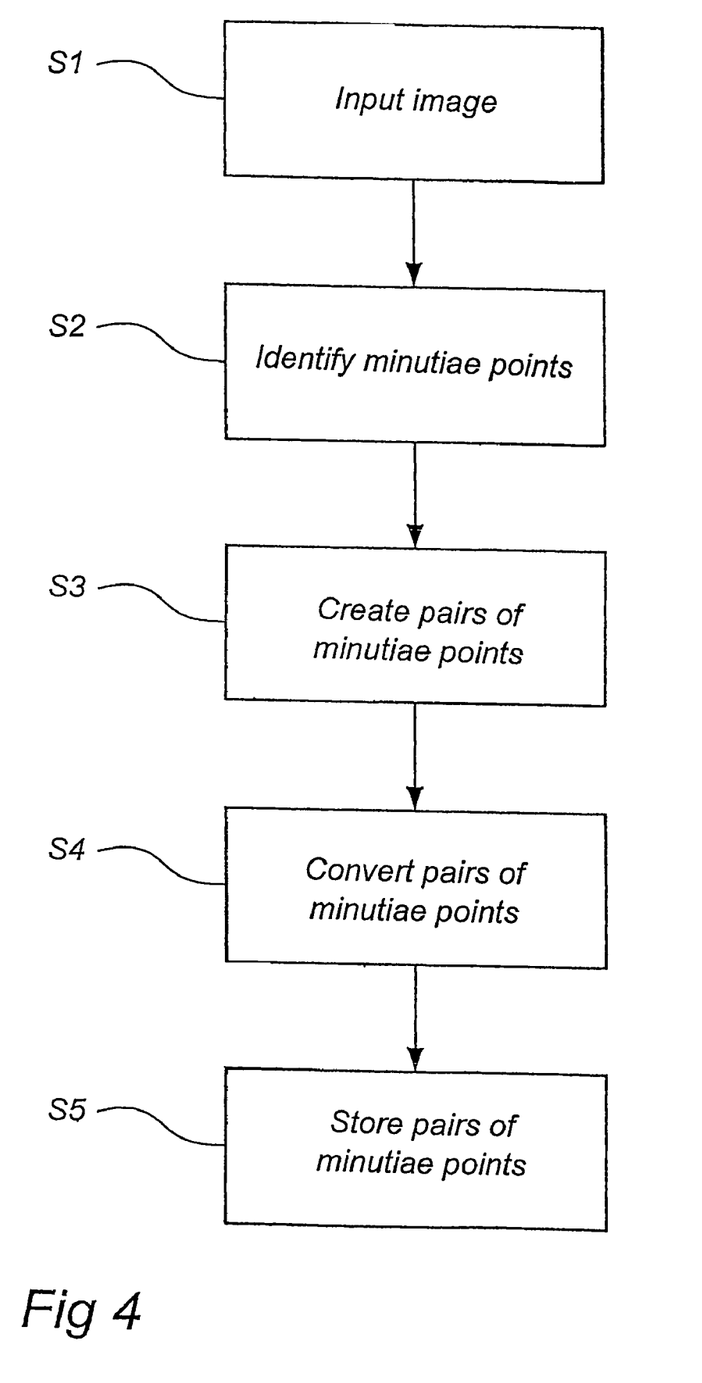
FIG. 4 is a schematic flow chart of a first method according to the invention.

With reference to FIG. 4, a method of creating reference fingerprint data (template), i.e. an enrolment method, will now be described.

In a prior-art manner, a fingerprint in the form of an image is input and preprocessed in step S1. In step S2, minutiae points M1, M2, M3 from the image are identified and stored in the form of a list according to the Example in Table 1 above.

As described above with reference to FIG. 1 and FIG. 2, a list of points is created, which list for each minutiae point comprises at least one x coordinate, y coordinate and absolute angle relative to the coordinate system of the image. Table 2 is a list of the minutiae points shown in FIG. 3.

TABLE 2

Minutiae points from FIG. 3a

| Point | Direction | x coord | y coord |
|---|---|---|---|
| M1 | θ1 | X1 | Y1 |
| M2 | θ2 | X2 | Y2 |
| M3 | θ3 | X3 | Y3 |

Based on the minutiae points in FIG. 3a, three different pairs of minutiae points can be created, as shown in Table 3, in step S3. Coordinates and orientation of the pairs of minutiae points shown in Table 3 are indicated relative to the coordinate system for the image of the fingerprint.

TABLE 3

Pairs of minutiae points from FIG. 3a

| | 1st point | | | 2nd point | | |
|---|---|---|---|---|---|---|
| Pairs | x coord | y coord | Direction | x coord | y coord | Direction |
| M12 | X1 | Y1 | θ1 | X2 | Y2 | θ1 |
| M13 | X1 | Y1 | θ1 | X3 | Y3 | θ3 |
| M23 | X2 | Y2 | θ2 | X3 | Y3 | θ3 |

In step S4, the pairs of minutiae points are converted so that each pair of minutiae points is described by means of a distance between the points included in the pair and angles between the directional vector of the respective minutiae points and a straight line between the minutiae points.

As indicated in FIG. 3b, the distance D12 between two points M1, M2 can be calculated by Pythagoras theorem according to equation 1.

$$D12 = \sqrt{(x1-x2)^2 + (y1-y2)^2} \quad (1)$$

Then an angle $\phi_{12}$ for a distance line between M1 and M2 can be determined by means of, for example, equation 2.

$$\tan\varphi_{12} = \frac{y1 - y2}{x1 - x2} \quad (2)$$

As shown in FIG. 3b, the angle V12 of a first minutiae point M1 relative to the distance line between the minutiae points M1 and M2 can be determined by equation 3.

$$V12 = \theta1 - \phi12 \quad (3)$$

The second minutiae point included in the pair is determined correspondingly and the pairs of minutiae points can be represented according to Table 4. The angles have been marked with a two-digit index, the first digit indicating at which minutiae point the angle lies and the second digit indicating the minutiae point in relation to which the angle is calculated.

TABLE 4

Converted pairs of minutiae points

| Pair | Distance | Angle at 1st point | Angle at 2nd point |
|---|---|---|---|
| M12 | D12 | V12 | V21 |
| M13 | D13 | V13 | V31 |
| M23 | D23 | V23 | V32 |

The representation of the angles can be sampled to a value which can be represented in a suitable manner. In the example described, the angles have been sampled to 3 bits, i.e. a number between 0 and 7, which gives a resolution of 45°. However, it will be appreciated that in a real application, a higher resolution may be convenient, the respective angles being represented by, for instance, 4, 5, 6, 8 16 or 32 bits.

A sampling of the angles in Table 4 may produce values as are evident from Table 5 below.

TABLE 5

Sampled angle values

| Pair | Distance | Angle at 1st point | Angle at 2nd point |
|---|---|---|---|
| M12 | D12 | 1 | 7 |
| M13 | D13 | 2 | 1 |
| M23 | D23 | 1 | 6 |

A two-dimensional storage structure, for example a matrix P, is then created, as will be evident from Table 6 below. In the matrix, there are arranged in step S5 the values of D12, D13 and D23, respectively, in cells that are indexed by the first V1 and second V2 angles, as will be shown in Table 6. The other cells in the matrix can be filled, for instance, with zeros or another desired value.

TABLE 6

Distance values introduced into the matrix P

| | V2 | | | | | | | |
|---|---|---|---|---|---|---|---|---|
| V1 | 0 | 1 | 2 | 3 | 4 | 5 | 6 | 7 |
| 0 | 0 | 0 | 0 | 0 | 0 | 0 | 0 | 0 |
| 1 | 0 | 0 | D13 | 0 | 0 | 0 | 0 | 0 |
| 2 | 0 | 0 | 0 | 0 | 0 | 0 | 0 | 0 |
| 3 | 0 | 0 | 0 | 0 | 0 | 0 | 0 | 0 |
| 4 | 0 | 0 | 0 | 0 | 0 | 0 | 0 | 0 |

TABLE 6-continued

Distance values introduced into the matrix P

| V1 | V2 | | | | | | | |
|---|---|---|---|---|---|---|---|---|
| | 0 | 1 | 2 | 3 | 4 | 5 | 6 | 7 |
| 5 | 0 | 0 | 0 | 0 | 0 | 0 | 0 | 0 |
| 6 | 0 | D23 | 0 | 0 | 0 | 0 | 0 | 0 |
| 7 | 0 | D12 | 0 | 0 | 0 | 0 | 0 | 0 |

According to one embodiment, sampling can take place in connection with step S5. Alternatively, sampling can place previously, for instance in one of the steps S3 and S4.

If two pairs of minutiae points should receive the same index, i.e. be positioned in the same cell in the matrix P in Table 6, it is possible to select which one is to be positioned there. For example, it is possible to keep the pair of minutiae points that are closest to each other, i.e. that have the lowest value of D.

Thus, the matrix P is filled up until it contains all, or a predetermined amount of, pairs of minutiae points. The matrix P can in a prior-art manner be represented as a number sequence.

In enrolment of a fingerprint, an enrolment matrix $P_E$ is thus created, which can be used as a template. The enrolment matrix can be stored space-efficiently on, for example, a smart card.

Figure 5:
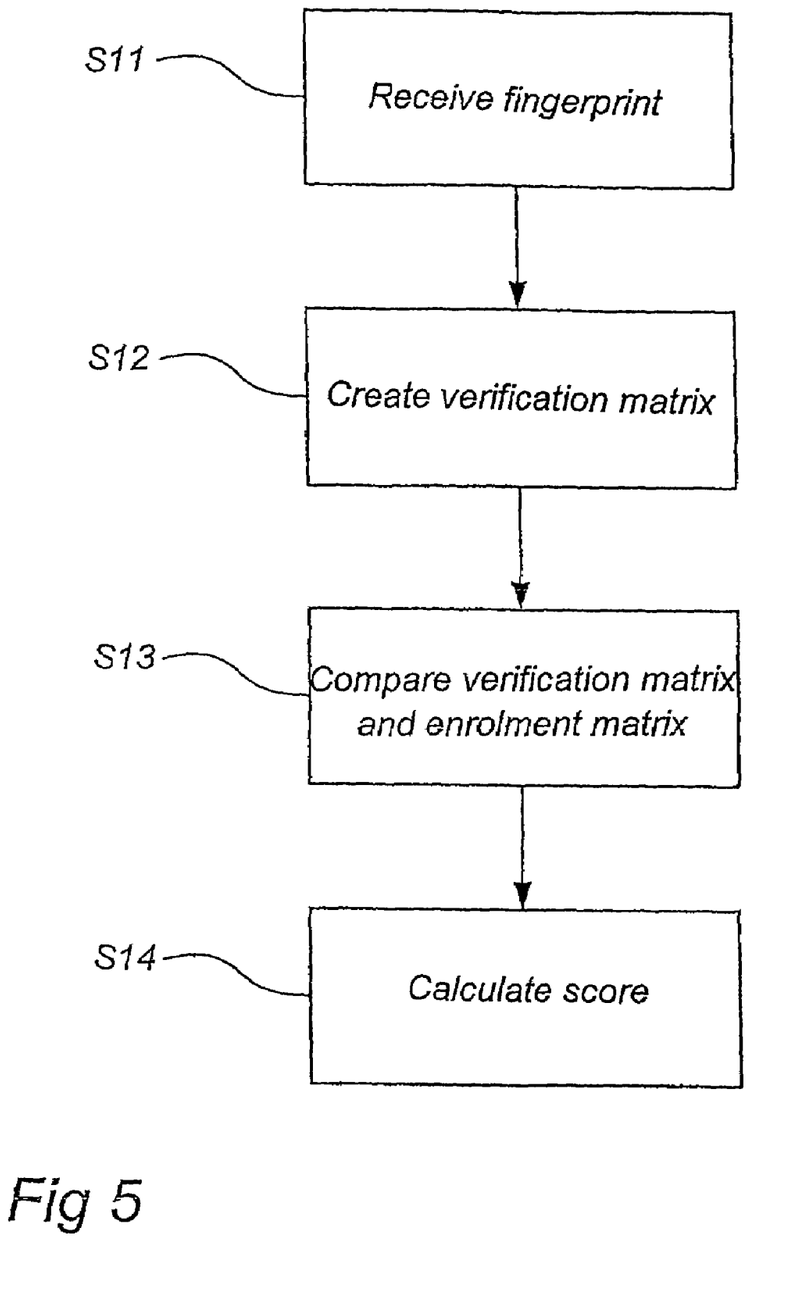
FIG. 5 is a schematic flow chart of a second method according to the invention.

With reference to FIG. 5, a method for verification or identification will now be described. When a fingerprint is recorded in connection with verification or identification, a verification matrix or an identification matrix $P_V$ or $P_I$, respectively, can be created correspondingly. In the description below, only the case of verification will be described, for the sake of simplicity. It will be appreciated that the method in identification is analogous.

A fingerprint 1 is received in step S11 from, for example, a fingerprint reader (not shown). In step S12, the fingerprint is preprocessed in a manner corresponding to that described with reference to FIG. 4, whereby a verification matrix $P_V$ is created.

An enrolment matrix $P_E$ can be obtained from a data carrier, such as a smart card, or from a database comprising a plurality of enrolment matrices, as is the case in identification. The enrolment matrix $P_E$ can be determined according to the method described with reference to FIG. 4. Step S12 can be performed in the fingerprint reader, and the verification matrix is sent to the smart card for further processing.

In step S13, a comparison of the verification matrix and the enrolment matrix is effected. Such a comparison can be made position by position, an absolute difference being calculated for each position.

Based on the comparison in step S13, a score can be calculated in S14, which score represents how well the verification matrix $P_V$ and the enrolment matrix $P_E$ match each other. The score can suitably be scaled so that its value is compatible with the corresponding scores from other identification techniques.

According to another embodiment of the invention, the angles associated with the minutiae points from an image of a fingerprint can be represented relative to a common system of coordinates, and arranged in a data structure in a manner analogous to the above-described method. In matching, a data structure representing a verification matrix can be compared with a data structure representing an enrolment matrix, in the manner described above. If the match is worse than a given threshold value, the angles represented in the enrolment matrix can be increased or decreased by a given value, whereby a new verification matrix, containing the distance values which each are indexed by two angles, can be obtained, and the comparison is repeated once more.

The method can then be repeated until a predetermined number of rotations have been tested, or until a sufficiently good match is obtained.

Figure 6:
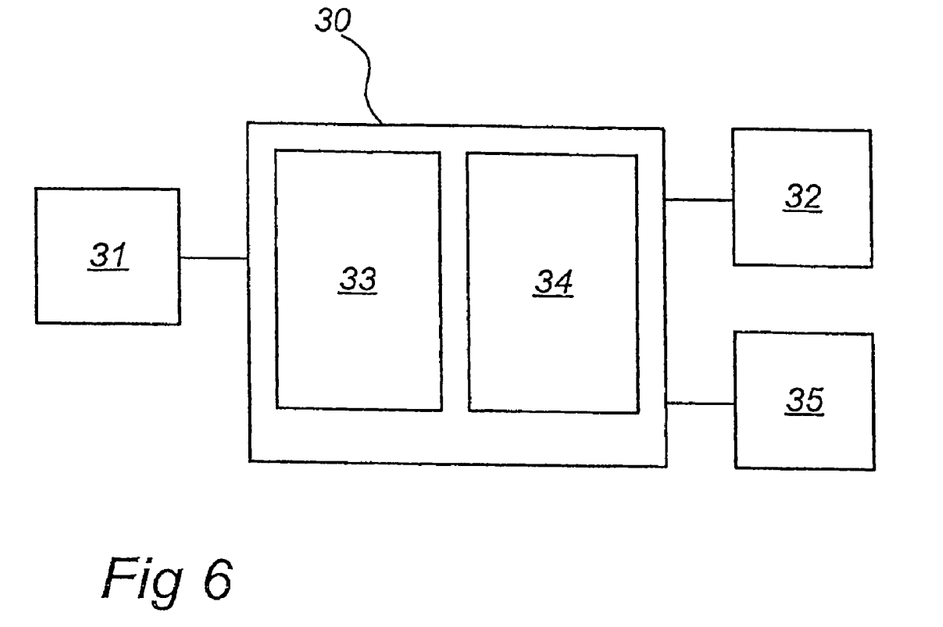
FIG. 6 is a schematic block diagram which shows a device according to one aspect of the invention.

FIG. 6 shows a device 30 in which the method according to the invention can be carried out. The device comprises at least one data processing unit 33, such as a microprocessor or a digital signal processor. The device can be connected to, or integrated with, a reader 31 for fingerprints. Moreover the device may comprise a memory 34 for storing instructions, which, when executed, make the device carry out the method according to the invention. The device can also be connected to, or integrated with, a reader 32 for data carriers, from which reference data for a user can be obtained, or to a data storage unit 35, from which reference data from one or more users can be obtained.

As mentioned above, it is possible to supplement the above-described storage by storing, in addition to the distance between a pair of minutiae points, an indication of the type of each minutiae point or its absolute angle relative to the fingerprint.

Since the matrices $P_E$, $P_V$ in many cases may consist mainly (for instance above 50%) of zeros, these can be compressed in a prior-art manner so as to take up less storage space. Examples of suitable compressing methods can be Hoffmann coding and run length coding.

It is also possible to combine the above-described method with other verification or identification methods for the purpose of providing a more reliable identity check. For example, scores from different verification methods can be combined, such as in averaging etc.

It is also conceivable to use the above-described method as a screening method to quickly find one or more fingerprints that should be analysed in more detail. This can be particularly advantageous in identification based from a database containing a large number of templates.

It will be appreciated that the invention is not restricted to the embodiments described above and can be varied within the scopes of the appended claims. It will also be appreciated that the described embodiments can be combined.

The invention claimed is:

1. A method of using a device having a data processing unit for checking a person's identity for creating a representation of a fingerprint, comprising the steps of:
   forming, by means of the data processing unit, a set of unique pairs of minutiae points identified in the fingerprint, each unique pair of minutiae points being represented by a distance between said minutiae points and by angles associated with the respective minutiae points included in the pair, and representing said set of unique pairs of minutiae points as a data structure comprising a two-dimensional matrix of cells containing distance values is indexed based on said respective angles associated with said minutiae points included in the unique pair, whereby each of the cells is uniquely pointed out by letting the angles associated with the minutiae points constitute the index.

2. A method as claimed in claim 1, wherein said angles constitute coordinates in a coordinate system, and
   wherein said distance is stored at the point indexed by said angles.

3. A method as claimed in claim 1 or 2, wherein said angles represent the orientation of the respective minutiae points.

4. A method as claimed in claim 1, wherein said unique pair of minutiae points is only represented by said distance and said angles.

5. A method as claimed in claim 1, wherein said pair is also represented by data indicating the type of the respective minutiae points.

6. A method as claimed in claim 1, wherein said angles are represented relative to a straight line extending through both minutiae points included in the pair.

7. A method as claimed in claim 1, wherein said angles are represented relative to a predetermined coordinate system.

8. A method as claimed in claim 1, wherein said data structure is two-dimensionally indexed,
   a first dimension being indexed based on a first angle, which is associated with a first minutiae point included in said pair of minutiae points, and
   a second dimension being indexed based on a second angle, which is associated with a second minutiae point included in said pair of minutiae points.

9. A method for use in checking a person's identity, comprising identifying in an electronic representation of a fingerprint first and second minutiae points,
   determining said distance between said first and second minutiae points, and
   determining first and second angles associated with said first and second minutiae points, wherein the method comprises steps as claimed in claim 1.

10. A method as claimed in claim 7, wherein said electronic representation of a fingerprint represents a current fingerprint, the method further comprising receiving an enrolment matrix, and comparing said enrolment matrix with said data structure.

11. A method as claimed in claim 10, further comprising the step of comparing a predetermined value in said enrolment matrix with a predetermined value in said data structure.

12. A method as claimed in claim 11, further comprising the step of creating a difference between said predetermined value in the enrolment matrix and said predetermined value in the data structure.

13. A method as claimed in claim 1, wherein the method is performed on a smart card.

14. A computer program readable product stored on a computer readable medium comprising instructions for execution in a data processing unit, wherein the instructions are adapted to operate said data processing unit to perform the method as claimed in claim 1.

15. A computer program readable product as claimed in claim 14, comprising a smart card.

16. A device for use in checking a person's identity, comprising a data processing unit, wherein said data processing unit is arranged to create a set of unique pairs of minutiae points identified in the fingerprint of the person, each unique pair of minutiae points being represented by a distance between said minutiae points and by angles associated with the respective minutiae points included in the pair, wherein said set of unique pairs of minutiae points is represented as a data structure comprising a two dimensional matrix of cells containing distance values that is indexed based on said respective angles associated with said minutiae points included in the unique pair, whereby each of the cells is uniquely pointed out by letting the angles associated with the minutiae points constitute the index.

17. A device for use in checking a person's identity, comprising a data processing unit, wherein said data processing unit is arranged to compare a representation of a current fingerprint of the person with reference fingerprint data, said representation of a current fingerprint comprising a set of unique pairs of minutiae points identified in the current fingerprint, and said reference fingerprint data comprising a set of unique pairs of minutiae points identified in a reference fingerprint, each unique pair of minutiae points being represented by a distance between said minutiae points and by angles associated with the respective minutiae points included in the pair, and wherein said set of unique pairs of minutiae points is represented as a data structure comprising a two dimensional matrix of cells containing distance values that is indexed based on said respective angles associated with said minutiae points included in the unique pair, whereby each of the cells is uniquely pointed out by letting the angles associated with the minutiae points constitute the index.

18. A device as claimed in claim 17, wherein the device comprises a smart card.

19. A method for creating reference data for checking a person's identity, comprising
   identifying in an electronic representation of a fingerprint first and second minutiae points,
   determining a distance between said first and second minutiae points, and
   determining first and second angles associated with said first and second minutiae points, wherein the method comprises the steps recited in claim 1.

20. A method as claimed in claim 19, further comprising the step of storing said data structure on a portable data carrier.

21. A computer program readable product comprising instructions for execution in a data processing unit, wherein the instructions are adapted to operate said data processing unit perform the method recited in claim 19 or 20.

22. A device for creating reference data for checking a person's identity, comprising a data processing unit, wherein said data processing unit is arranged to create a set of unique pairs of minutiae points identified in the person's fingerprint, each unique pair of minutiae points being represented by a distance between said minutiae points and by angles associated with the respective minutiae points included in the pair, wherein said set of unique pairs of minutiae points is represented as a data structure comprising a two dimensional matrix of cells containing distance values that is indexed based on said respective angles associated with said minutiae points included in the unique pair, whereby each of the cells is uniquely pointed out by letting the angles associated with the minutiae points constitute the index.

* * * * *